(12) United States Patent
Jooste

(10) Patent No.: US 9,600,350 B2
(45) Date of Patent: Mar. 21, 2017

(54) DELIVERY OF A USER INTERFACE USING HYPERTEXT TRANSFER PROTOCOL

(75) Inventor: Sarel Kobus Jooste, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 23 days.

(21) Appl. No.: 13/162,365

(22) Filed: Jun. 16, 2011

(65) Prior Publication Data

US 2012/0324358 A1 Dec. 20, 2012

(51) Int. Cl.
*G06F 3/00* (2006.01)
*G06F 9/54* (2006.01)

(52) U.S. Cl.
CPC ........... *G06F 9/54* (2013.01); *G06F 2209/545* (2013.01)

(58) Field of Classification Search
CPC ... H04L 67/02; H04L 47/10; G06F 9/45533; G09G 2310/04; G09G 2370/10
USPC ............... 715/733, 736, 740, 749, 753, 741; 345/418; 709/219
See application file for complete search history.

(56) References Cited

U.S. PATENT DOCUMENTS

| | | | |
|---|---|---|---|
| 5,214,519 A * | 5/1993 | Faulhaber et al. ............. 358/451 |
| 5,333,212 A * | 7/1994 | Ligtenberg ........... H04N 19/172 375/240.01 |
| 5,363,483 A * | 11/1994 | Jones ....................... G06T 15/40 345/619 |
| 6,571,245 B2 * | 5/2003 | Huang et al. |
| 6,591,266 B1 * | 7/2003 | Li et al. |
| 6,813,641 B2 * | 11/2004 | Fomenko et al. ............ 709/230 |
| 6,915,486 B2 * | 7/2005 | Li et al. ......................... 715/765 |
| 6,950,101 B2 * | 9/2005 | Hunt et al. ................... 345/428 |
| 6,983,421 B1 * | 1/2006 | Lahti et al. ................... 715/763 |
| 7,000,008 B2 * | 2/2006 | Bautista-Lloyd . G06F 17/30899 707/E17.119 |
| 7,308,490 B2 * | 12/2007 | Peiffer et al. ................. 709/219 |
| 7,349,905 B1 * | 3/2008 | Jooste |
| 7,418,472 B2 * | 8/2008 | Shoemaker ....... H04L 29/06027 709/203 |
| 7,426,578 B2 | 9/2008 | Jones et al. |
| 7,426,875 B1 | 9/2008 | McMillan |
| 7,502,838 B2 * | 3/2009 | Franco et al. ................ 709/219 |
| 7,522,536 B2 * | 4/2009 | Roberts ................... H04L 29/06 370/252 |
| 7,703,024 B2 * | 4/2010 | Kautzleben et al. ......... 715/749 |
| 7,747,694 B2 * | 6/2010 | McAllister .......... H04L 67/2857 709/206 |
| 7,805,523 B2 * | 9/2010 | Mitchell et al. .............. 709/228 |
| 7,805,670 B2 * | 9/2010 | Lipton et al. ................. 715/234 |
| 7,882,173 B2 * | 2/2011 | Hirsch et al. ................. 709/203 |
| 7,890,598 B2 * | 2/2011 | Lakamp ........................ 709/217 |
| 8,073,990 B1 * | 12/2011 | Baron ...................... G06F 13/28 710/22 |
| 8,112,473 B2 * | 2/2012 | Saillet .......................... 709/203 |
| 8,209,372 B2 * | 6/2012 | Abdo et al. ................... 709/200 |
| 8,224,885 B1 * | 7/2012 | Doucette ............... G06F 9/5044 709/201 |
| 8,341,270 B2 * | 12/2012 | Mazzaferri et al. .......... 709/227 |
| 8,400,491 B1 | 3/2013 | Panpaliya et al. |
| 8,572,162 B2 | 10/2013 | Gokaraju et al. |
| 8,621,031 B2 | 12/2013 | Desai |
| 8,769,400 B1 | 7/2014 | Thomas et al. |
| 8,913,067 B1 | 12/2014 | Kokkevis |
| 2002/0063715 A1 | 5/2002 | Foran |
| 2002/0111995 A1 * | 8/2002 | Mansour et al. ............. 709/203 |
| 2003/0093585 A1 * | 5/2003 | Allan ................... G06F 17/3089 719/330 |
| 2003/0163510 A1 * | 8/2003 | Janssen .......................... 709/100 |
| 2004/0054671 A1 * | 3/2004 | Cohen et al. ...................... 707/3 |

(Continued)

*Primary Examiner* — Maryam Ipakchi

(57) ABSTRACT

A method is provided to remotely access an application hosted by a server and having a corresponding application graphical user interface (GUI) represented on the server, the method comprising: a client automatically sending GUI display update requests to the server throughout a duration of the access, the requests being HTTP requests over corresponding HTTP connections.

18 Claims, 6 Drawing Sheets

(56) References Cited

U.S. PATENT DOCUMENTS

| | | | |
|---|---|---|---|
| 2004/0103438 A1* | 5/2004 | Yan | H04L 29/06027 725/109 |
| 2004/0177147 A1* | 9/2004 | Joshi et al. | 709/227 |
| 2005/0138122 A1 | 6/2005 | Boehringer et al. | |
| 2005/0149529 A1* | 7/2005 | Gutmans | 707/10 |
| 2005/0198364 A1* | 9/2005 | Val et al. | 709/236 |
| 2005/0256923 A1* | 11/2005 | Adachi | G06F 17/30905 709/203 |
| 2006/0039466 A1* | 2/2006 | Emerson et al. | 375/240.01 |
| 2006/0039468 A1* | 2/2006 | Emerson | G06F 3/1454 375/240.01 |
| 2006/0082583 A1* | 4/2006 | Leichtling et al. | 345/522 |
| 2006/0156315 A1* | 7/2006 | Wood et al. | 719/328 |
| 2006/0168526 A1* | 7/2006 | Stirbu | G06F 3/14 715/740 |
| 2006/0174026 A1* | 8/2006 | Robinson et al. | 709/231 |
| 2006/0203007 A1* | 9/2006 | Bullard et al. | 345/619 |
| 2006/0212514 A1* | 9/2006 | Saillet | 709/203 |
| 2006/0248200 A1 | 11/2006 | Stanev | |
| 2006/0265662 A1* | 11/2006 | Gertzen | G06F 9/4443 715/760 |
| 2007/0005990 A1 | 1/2007 | Sathish | |
| 2007/0009182 A1* | 1/2007 | Yamauchi | G09G 5/397 382/302 |
| 2007/0046980 A1* | 3/2007 | Coleman et al. | 358/1.15 |
| 2007/0073730 A1* | 3/2007 | Jun | 707/10 |
| 2007/0110303 A1* | 5/2007 | Bhattacharjya | G09G 3/2003 382/166 |
| 2007/0174429 A1* | 7/2007 | Mazzaferri et al. | 709/218 |
| 2007/0174474 A1* | 7/2007 | Zhong | H04L 29/06027 709/230 |
| 2007/0204003 A1* | 8/2007 | Abramson | H04L 67/02 709/217 |
| 2007/0271332 A1* | 11/2007 | Joshi et al. | 709/203 |
| 2008/0005236 A1 | 1/2008 | Schmieder | |
| 2008/0094411 A1* | 4/2008 | Parenteau | G06T 15/503 345/592 |
| 2008/0098301 A1 | 4/2008 | Black et al. | |
| 2008/0114889 A1* | 5/2008 | Deshpande | 709/231 |
| 2008/0201751 A1* | 8/2008 | Ahmed | H04N 21/4312 725/109 |
| 2008/0313545 A1* | 12/2008 | Patel | G06F 9/4445 715/738 |
| 2008/0320531 A1 | 12/2008 | Kim et al. | |
| 2009/0100125 A1* | 4/2009 | McDowell | G06F 17/30902 709/203 |
| 2009/0196406 A1 | 8/2009 | Brown et al. | |
| 2009/0254664 A1* | 10/2009 | Wada | 709/227 |
| 2009/0254982 A1* | 10/2009 | Jansen et al. | 726/8 |
| 2009/0271779 A1* | 10/2009 | Clark | G06F 17/30174 717/171 |
| 2009/0313322 A1* | 12/2009 | Sheehan et al. | 709/203 |
| 2009/0319249 A1 | 12/2009 | White et al. | |
| 2009/0327468 A1* | 12/2009 | Hirsch et al. | 709/223 |
| 2010/0023855 A1 | 1/2010 | Hedbor et al. | |
| 2010/0054618 A1* | 3/2010 | Kawazoe et al. | 382/239 |
| 2010/0077058 A1* | 3/2010 | Messer | H04L 67/02 709/219 |
| 2010/0115023 A1* | 5/2010 | Peled | 709/203 |
| 2010/0138476 A1* | 6/2010 | Gokaraju et al. | 709/203 |
| 2010/0138744 A1* | 6/2010 | Kamay | G06F 9/4445 715/716 |
| 2010/0220592 A1* | 9/2010 | Pan | H04L 1/0017 370/232 |
| 2010/0223348 A1 | 9/2010 | Przybysz et al. | |
| 2010/0226441 A1* | 9/2010 | Tung | H04N 21/2343 375/240.24 |
| 2010/0250747 A1 | 9/2010 | Karaoguz et al. | |
| 2010/0268694 A1 | 10/2010 | Denoue et al. | |
| 2010/0269048 A1* | 10/2010 | Pahlavan et al. | 715/740 |
| 2010/0325300 A1* | 12/2010 | Vasters et al. | 709/231 |
| 2010/0332654 A1* | 12/2010 | Bose | G06F 9/4443 709/224 |
| 2011/0082946 A1* | 4/2011 | Gopalakrishnan | 709/231 |
| 2011/0096828 A1* | 4/2011 | Chen | H04N 21/23106 375/240.02 |
| 2011/0134120 A1* | 6/2011 | Antonyuk | G06F 3/1454 345/426 |
| 2011/0141123 A1* | 6/2011 | Kumar et al. | 345/520 |
| 2011/0148892 A1* | 6/2011 | Shreiner | G06T 11/40 345/545 |
| 2011/0184993 A1* | 7/2011 | Chawla et al. | 707/802 |
| 2011/0231569 A1* | 9/2011 | Luby | H04N 21/23106 709/234 |
| 2011/0258532 A1 | 10/2011 | Ceze | |
| 2011/0276619 A1* | 11/2011 | Khan et al. | 709/203 |
| 2011/0276900 A1 | 11/2011 | Khan et al. | |
| 2011/0310105 A1* | 12/2011 | Koneru | G06F 3/14 345/501 |
| 2011/0316965 A1 | 12/2011 | Moore et al. | |
| 2012/0060083 A1 | 3/2012 | Yuan et al. | |
| 2012/0066679 A1 | 3/2012 | Pappas et al. | 718/1 |
| 2012/0076197 A1* | 3/2012 | Byford et al. | 375/240.01 |
| 2012/0102392 A1 | 4/2012 | Reesman et al. | |
| 2012/0110201 A1* | 5/2012 | Furbeck | 709/231 |
| 2012/0117145 A1* | 5/2012 | Clift et al. | 709/203 |
| 2012/0120320 A1 | 5/2012 | Chowdhry et al. | |
| 2012/0131645 A1* | 5/2012 | Harm | 726/4 |
| 2012/0151373 A1* | 6/2012 | Kominac et al. | 715/740 |
| 2012/0159311 A1 | 6/2012 | Hanssen | |
| 2012/0256949 A1 | 10/2012 | Treat | |
| 2012/0260157 A1 | 10/2012 | Zhu | |
| 2012/0324037 A1* | 12/2012 | Ramadas | 709/213 |
| 2013/0054672 A1 | 2/2013 | Stilling et al. | |
| 2013/0055113 A1 | 2/2013 | Chazin et al. | |
| 2013/0335320 A1 | 12/2013 | Mori et al. | |
| 2014/0028690 A1* | 1/2014 | Rivera | G06F 3/1415 345/520 |

* cited by examiner

DELIVERY OF A USER INTERFACE USING HYPERTEXT TRANSFER PROTOCOL

BACKGROUND

Application publishing or server based computing allows a client computer to access and utilize an application program or operating system that runs on a remote server. The server sends a graphical user interface for the application or operating system over a network to the client. A user provides input to client computer input devices, which the client sends over the network to the server. In this way, a user interface, which may include a full desktop or just the user interface of a particular application is "remoted" to a user over a network.

Remote Desktop Services (RDS) is one of the components of the Microsoft Windows operating system that allows a user to access the operating system, applications, and data on a remote computer over a network. RDS employs a protocol known as the Remote Desktop Protocol (RDP) to for remoting a desktop over a network. The server component of RDS is called Terminal Server, which listens on a configured Transmission Control Protocol (TCP) port, typically port 3389. When an RDP client connects to this port, it is associated with a unique TCP session. A graphics device interface (GDI) graphics subsystem authenticates the user and presents the UI to the client machine. Once a client initiates a connection and is informed of a successful invocation of a terminal services stack at the server, it loads keyboard/mouse drivers delivered to it over the network by the server. The graphical user interface (GUI) data received over RDP is decoded and rendered as a GUI on the client machine. Keyboard and mouse inputs by the user to the client machine ordinarily are transmitted to the server to allow a user control and access applications and data on the remote server.

Virtual Network Computing (VNC) is a graphical desktop sharing system that typically uses the Remote Frame Buffer (RFB) protocol to allow a client to remotely control a computer system over a persistent TCP connection, typically using TCP port 5900. The RFB protocol allows a server to update the frame buffer displayed on a VNC viewer running on the client machine. In general terms, a frame buffer typically occupies a portion of a Random Access Memory (RAM) used for temporary storage of image data that available for display. A VNC viewer running on one operating system on a client may connect to a VNC server running on the same or a different operating system. In the RFB protocol, the server sends small rectangles of the server machine frame buffer to the client, which the client then assembles to form the graphical user interface. VNC allows for various encoding methods to determine the most efficient way to transfer the rectangles from the server frame buffer to the client. The VNC protocol ordinarily allows the client and server to negotiate which encoding will be used. One encoding method supported by most VNC clients and servers, is "raw encoding," in which pixel data is sent in left-to-right scan-line order, and in which after the first or original full screen has been transmitted, only frame buffer rectangles that have changed are transferred.

Some VNC implementations, .e.g., "RealVNC," available from RealVNC Ltd. of Cambridge, UK, use a Hypertext Transfer Protocol (HTTP) server to provide a VNC viewer to the client as a Java applet. The Java applet then connects to the VNC server for remote UI access over a separate persistent TCP connection, typically over TCP port 5900. Yet another VNC implementation, referred to as "Thin-VNC," available from Cybele Software, Inc. of Wilmington, Del. uses the WebSocket protocol of HTML5 for remote access to a user interface. WebSocket involves use of a persistent TCP connection between a client and a server that runs a remote application. WebSocket uses HTTP as a conduit to set up persistent connection between client and server. In particular, WebSocket features an HTTP-compatible handshake that allows a server to interpret part of the handshake request as HTTP and then switch to WebSocket.

Existing technologies therefore require persistent connections over exotic TCP ports for remoting a user interface or through advanced, and potentially insecure, web technologies such as WebSockets, which is not always available.

SUMMARY

A system and method described herein provide remoting capability using a typical HTML 4 web browser and standard HTTP connections only. In one embodiment, a client runs sends graphical user interface update requests to the server throughout a duration of the access, wherein each of the GUI update requests is communicated to the server via a corresponding HTTP connection. The client then receives, in response to each GUI update request, a response from the server that includes an encoded image of at least a portion of the GUI.

BRIEF DESCRIPTION OF THE DRAWINGS

Some embodiments are illustrated by way of example and not limitation in the figures of the accompanying drawings. Any item shown in a drawing that is identical to or substantially the same as an item shown in another drawing is labeled with the same reference numeral in both drawings.

DETAILED DESCRIPTION

Figure 1A:
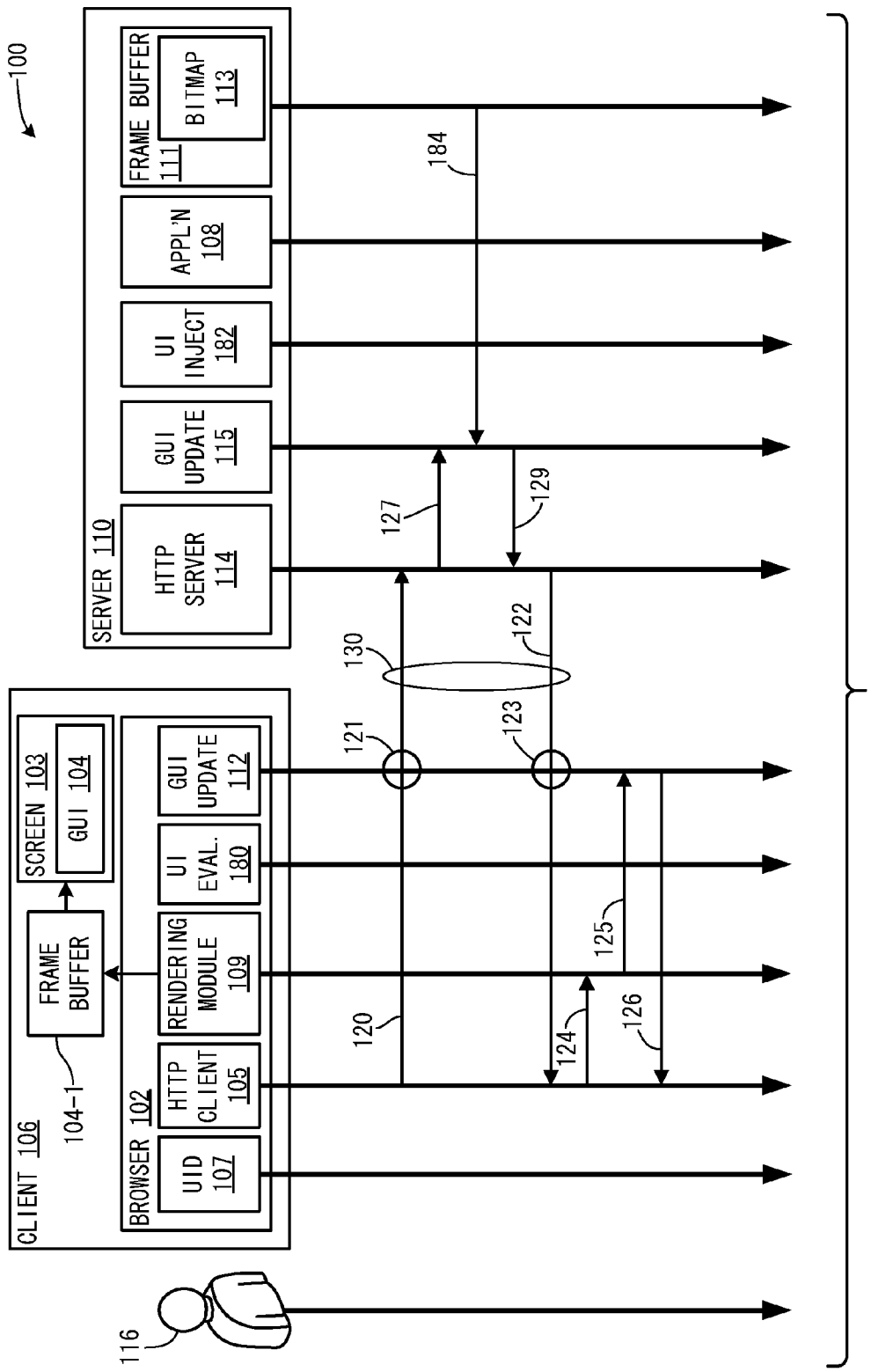
FIG. 1A is illustrates components of a system for remote client with a sequence of communications to update a GUI on the client.

With regard to the following description, it should be recognized that various modifications may be made without departing from the spirit and scope of the invention, defined in the appended claims. Moreover, numerous details are set forth for the purpose of explanation, and should not be construed as limiting of the invention.

As used herein, the term, "computer" encompasses physical computers as well as virtual machines. A virtual machine is a software implementation of a physical computer. The term "computer" encompasses, without limitation, a personal computer (PC), a tablet PC, mobile device, or any processing device capable of executing a set of instructions (sequential or otherwise) that specify actions to be taken by that device.

As used herein, the terms "server computer" (or "server") and "client computer" (or "client") indicate the relationship between two computers and/or software entities, that communicate through the HTTP protocol. These terms do not define the physical location of the computers. For example, a virtual machine can reside on a physical computer and function as the server computer, while the same physical computer functions as the client computer.

As used herein, the term "user interface" ("UI") refers to the graphical, textual and auditory information for presentation to the user, and the control sequences (such as keystrokes with the computer keyboard, movements of the computer mouse, and selections with a touchscreen) that a user employs to interact with an application. A desktop is the user interface presented by a modern graphical operating system. A graphical user interface (GUI), is the portion of the UI that includes graphical information displayed for viewing by a user.

As used herein the term "browser" refers at a minimum to an application that uses the HTTP protocol or the like to retrieve information resources from the Internet and make them available for display by a computer. Some modern browsers also support the HTML5 "<canvas>" element, which provides a resolution-dependent bitmap canvas that provides a rectangle region within a web page in which JavaScript can be used to draw virtually anything, graphs, game graphics or visual images, on the fly.

Overview

In one embodiment, a client user device runs a browser that uses a network address indicator such as a URL to remotely access an application hosted on a server. The accessed server returns JavaScript (or, in alternate embodiments, other executable code supported by the browser) causing the client browser to send a Hypertext Transfer Protocol (HTTP) request to the server for a graphical user interface (GUI) for the application. The server captures a bitmap image of the GUI, or a portion thereof such as a part of a screen or specific application drawing interfaces, from a frame buffer, compresses the image, e.g. using PNG or JPEG encoding, and sends the compressed image to the client in a binary format or using HTML text, e.g. base64, to represent the binary in an HTTP response. Assuming that the image is sent in a text-encoded format, the browser running on the client decodes the text-coded bitmap image and displays the GUI for the application or desktop on the client.

Meanwhile, a user provides input to client user input devices, such as a mouse and keyboard. The client sends the user input to the server in one or more HTTP messages. The server injects the user input to the operating system running remotely on the server, which then responds by processing the user input and potentially changing the bitmap image of the GUI in a frame buffer. Thus, the GUI changes in the course of user interaction through the client with the operating system or application running on the server. Typically, these changes are incremental, affecting only a portion of the GUI at a time. A series of HTTP requests are sent from the client to the server to obtain the incremental updates to the GUI. The HTTP requests for GUI updates may run independently of and concurrently with the HTTP messages containing user input. Responses to requests for GUI updates may contain only updated or changed portions of the GUI. The browser therefore incrementally updates the GUI as a function of current update portions represented in the responses and portions of the GUI that were previously provided or previously updated, referred to herein as "pre-update portions". It will be appreciated that once a current update portion is incorporated into the GUI by the browser it becomes a part of the pre-update portions.

System for Remote Client Access to an Application Running on a Server

Figure 1B:
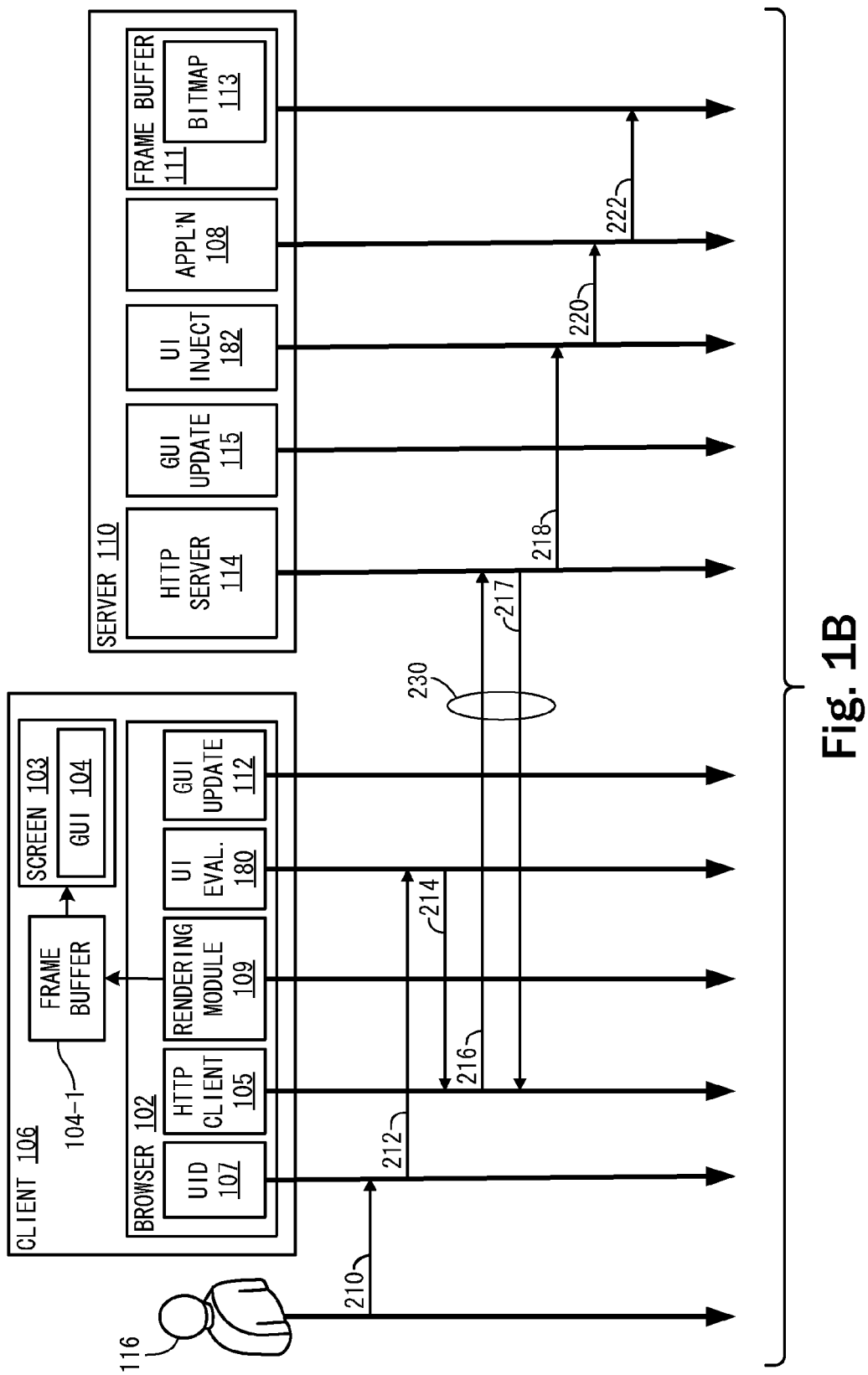
FIG. 1B illustrates components of a system for remote access with a sequence of communications to transmit user input from the client to the server.

FIGS. 1A and 1B show components of a system 100 for remote client access to an application ("APPL'N") 108 hosted on a server 110 and showing an illustrative sequence of communications to update a GUI 104 on the client 106 and to transmit user input from the client 106 to the server 110. The term, "GUI" should be construed broadly to encompass a single application window generated by an application, multiple windows generated by an application, or an entire desktop with multiple applications running thereon, the desktop being generated by an operating system, which may execute within a virtual machine. Methods for accessing a frame buffer containing either one or more application windows, or an entire desktop view, are well known or readily available.

Client machine 106 includes display screen 103 on which user 116 can view GUI 104 and which includes user input device ("UID") 107. Browser 102 runs on client machine 106 and includes rendering module 109 to generate GUI 104 on screen 103. Browser 102 also includes HTTP client protocol module ("HTTP CLIENT") 105 and GUI update request control module ("GUI Update") 112 that controls the sending of requests by HTTP client protocol module 105 for updates to GUI 104. User interface evaluation and encoding module ("UI EVAL.") 180 runs within browser 102 to intercept and evaluate input to user input device 107 before sending the input, often in modified form, to HTTP client protocol module 105 for transmission to server 110. It will be appreciated that although only one user input device block 107 is shown in FIG. 1, system 100 may include multiple user input devices (not shown) that user 116 can use to interact remotely with application 108 running on server 110. GUI update request control module 112 and evaluation and encoding module 180 may be implemented using a JavaScript code that is executed within browser 102 to interact with other components of browser 102.

Server machine ("Server") 110 runs application 108 that is accessed by client machine 106. Application 108 may be running natively on the same operating system as HTTP server 114 as shown, or it may be running on a separate operating system in a virtual machine (not shown), either on the same physical platform as server 110 or a separate physical platform. If Application 108 is running in a virtual machine on a separate physical platform, then there may be a separate communication channel between server 110 and the separate physical platform for obtaining screen updates and transmitting user inputs. However, these details are not presented here so as not to obscure the presently described communication protocol for remoting a user interface over HTTP. Frame buffer 111 contains GUI bitmap image 113. Server 110 may not directly produce a visible GUI display based on frame buffer 111, but rather frame buffer 111 is used simply for remoting purposes. GUI update response control module ("GUI UPDATE") 115 controls the sending of responses by HTTP server 114 to HTTP requests received from HTTP client protocol module 105. A user input injection module ("UI INJECT") 182 injects user input signals into application 108, e.g., via operating system calls. The user input signals may be transmitted by the client 106 through the evaluation and encoding module 180.

FIG. 1A illustrates by way of example communications for updating of the GUI at the client 106. FIG. 1B illustrates an exemplary communication for transmitting user input device signals from the client 106 to application 108 at the server. Both activities involve opening HTTP connections.

GUI Update

A GUI update HTTP transaction or connection 130, referred to herein as "GUI update HTTP connection 130," is used to update the GUI 104 on the client machine 106. A sequence of GUI update HTTP connections 130 (only one shown) of in FIG. 1A are used to transmit a corresponding sequence of bitmap image updates from server 110 to browser 102 to keep GUI 104 on client 106 current in light of changes to bitmap image 113 on server 110. Specifically, GUI update request control module 112 causes browser 102 to open a first GUI update HTTP connection and to send new HTTP requests to update GUI 104 frequently enough so as to keep up to date with changes in bitmap image 113 in frame buffer 111 on server 110.

To start the GUI update process, user 116 uses user interface device 107 to enter or select a URL or that is sent by browser 102 over an HTTP connection (not shown) that maps to application (or desktop) 108 on server 110 to the URL. Browser 102 sends the URL to server 110, which sends a response to acknowledge that a valid URL path/parameter has been used. An initial connection may require authentication of the user and downloading to browser 102 a tracking cookie and JavaScript (or other code that executes in conjunction with browser 102) to carry out the remoting process herein described. Once browser 102 receives the acknowledgement, the GUI update request process shown in FIG. 1A starts.

HTTP client protocol module 105 within the browser 102 opens a first TCP connection with the HTTP server 114 over which to send an HTTP GUI display update request 120. For the first request, and certain subsequent requests, HTTP GUI display update request 120 may include a flag indicating that an entire bitmap 113 is needed rather than just recent changes to bitmap 113. The GUI update request control module 112 detects the HTTP GUI display update request 120 as indicated by bubble 121.

The HTTP server 114 receives the HTTP request and provides updated request 127 to GUI update response module 115, which responds by obtaining an updated portion of bitmap image 113 as indicated by arrow 184. Bitmap image 113 may show the entire GUI of application (or desktop) 108. For the first GUI update request and subsequent request that are flagged by HTTP client 105, the entire bitmap image 113 may be retrieved rather than just updated portions thereof, as further described below. In alternate embodiments, browser 102 may have a limited input buffer as described in more detail below, in which case the entire GUI of application 108 may be transmitted in segments (individual bitmaps). GUI update response module 115 sends image data 129 to HTTP server 114, which sends HTTP GUI display update response 122 that contains image frame information to client 106 over the GUI update HTTP connection 130. Response 122 completes the HTTP transaction and hence closes GUI update HTTP connection 130. GUI update request control module 112 detects HTTP GUI display update response 122 as indicated by bubble 123. Server 110 may close the TCP connection over which GUI update HTTP connection 130 was transmitted following the sending of HTTP GUI display update response 122, although this is not required.

Image data included in response 122 is identified or provided by HTTP client 105 to rendering module 109 via signal 124. In some embodiments, HTTP GUI display update response 122 contains text-coded image data, and in that case, rendering module 109 decodes the text-encoded image data to create binary-encoded image data suitable for use in display of GUI 104 within screen 103. In some other embodiments, HTTP GUI display update response 122 contains binary-coded image data, and rendering module 109 uses the binary coded data to update the representation of the GUI, through a bit BLIT process, for example. Bit BLIT (bit block transfer) is a computer graphics process operation in which several bitmaps are combined into one. As explained more fully below, some browsers cannot handle binary coded image data, and text coded image data is used for such browsers.

GUI update request control module 112 monitors operation of rendering module 109, as indicted by arrow 125, to detect when rendering module 109 has completed rendering image data encoded in received HTTP response 122. In some embodiments, GUI update request control module 112 registers events in JavaScript code to intercept completion status of rendering module 109 to determine whether or not rendering of the image data is complete. When the rendering of the image data is complete, GUI update request control module 112 sends a request, indicated by arrow 126, to HTTP client protocol module 105 to send another HTTP request 120 for an update to the GUI 104. This process may be continued until interrupted by the user (e.g., by closing the browser window) or application 108 is exited (or the virtual machine is shut down) causing the closing of frame buffer 111, for example.

As explained above, the HTTP GUI update response 122 sent by server 110 over the second and subsequent GUI update HTTP connections 130 may contain only the current update portion of bitmap image 113. The current update portion of bitmap image 113 may be a current portion identified by GUI update module 115 that has changed since a previous update, and the change has not yet been sent to client 106. Frame buffer 111 may include multiple current update portions at any given time. HTTP responses containing changes represented by current update portions also include indications of the locations of those changes. In one embodiment, the locations of the current change is provided in the form of CSS (Cascading Style Sheets) instructions for example, to cause rendering module 109 to position and display an image representing the change within GUI 104.

In some embodiments, flow control may be implemented inside of the HTTP protocol, by overriding or intercepting the HTTP server delivery of data to the client. The rate of consumption of an HTTP response by client 106 may be measured. The data rate at which server 110 transmits HTTP responses sent over the network can be adjusted based upon the rate of consumption by client 106.

For browsers with limited HTML and only DOM (document object model) capabilities, rendering module 109 may use a layered approach in conjunction with JavaScript, CSS and the browser DOM. Alternatively, for browsers with the ability to process binary coded images, such as HTML5 compliant browsers, an approach is used involving bit BLIT operations in which pixel data from an update portion in HTTP GUI update responses are combined with pre-update pixel data provided in previous HTTP GUI update responses. In either case, an initial frame representing the entire GUI for application 108 (which may comprise the entire frame buffer 111) may be sent over the first connection. For each subsequent request, the difference or change between the current client-side frame buffer 104-1 on client 106 and the current frame buffer 111 on server 110 is calculated within in the server 110. The server can do this simply by tracking which regions of frame buffer 111 have been modified since a prior HTTP GUI update response containing image data for that region was sent. Once the portion(s) of change is/are identified, changed area(s) are encoded as image(s) and sent to browser 102 as part of an HTTP GUI update response. Browser 102 updates GUI 104 with image data provided by received in HTTP GUI update responses. It will be appreciated that browser 102 updates client-side frame buffer 104-1 used to produce the display. Client-side frame buffer 104-1 therefore contains a bitmap that is a composite of previously received image updates. More particularly, browser 102 decodes successive newly received text encoded representations of changed portions of bitmap 113 within the server frame buffer 111 and successively composites those decoded bitmap updates into client-side frame buffer 104-1 for use in updating GUI 104.

It will be appreciated that there may be limitations in different models or versions of browser as to how many image layers can be composited or stacked. For different types or versions of browser 102, the GUI update request control module 112 may be aware of the limitation, and may communicate this limitation to server 110, which can respond by sending a new key frame (i.e., full bitmap 113) to restart the layering process before browser 102 reaches its limit. Alternatively, GUI update request control module 112 may be configured to request a new key frame before browser 102 reaches its limit.

While FIG. 1A shows only a single frame buffer 111, it will be appreciated that multiple frame buffers may be involved with representation of the bitmap image 113. For example, application 108 may include multiple windows (not shown), each corresponding to bitmap image data within a different frame buffer. An HTTP response may include a composite of bitmap image data from different frame buffers to produce current GUI 104. Moreover, the bitmap image data may be compressed using JPG encoding or PNG encoding, for example. Certain GUI display portions may be best represented in PNG (e.g., text) and others in JPG (e.g., images or motion graphics and video). It may be appreciated, as browsers develop more encoding methods, that these will be utilized appropriately by both the server and client. GUI update request control module 112 may cause image portions that are compressed with different encoding techniques to be packaged in different HTTP responses. Thus, different updates within different HTTP responses may be encoded differently depending upon the image content, subject of course, to capability of browser 102 to handle such different encodings.

Ordinarily, the HTTP protocol is used over TCP/IP sockets. The HTTP protocol is a stateless protocol that does not allow permanent connections and does not support a stateful conversation between endpoints. Moreover, the HTTP protocol supports initiation of data transmission in only one direction, i.e. from client 106 to server 110. Thus, in order to ensure that GUI 104 is kept up to date, the above described process of sending a sequence of HTTP requests/ responses to update the GUI display 104 with the most recent bitmap image 113 in frame buffer 111 on server 110 continues throughout the duration of the session. Thus, a multitude of HTTP connections 130 may be opened and closed and a corresponding multitude of HTTP requests/ responses may be sent while user 116 remotely accesses application 108.

In the example embodiment of FIG. 1A, a single HTTP response 122 contains both the update portion of a bitmap image and the location within the overall GUI 104 where that update should be inserted. However, image update location information and image update content information may be provided over separate HTTP connections. In this case, the browser may first send a request for an image update over an HTTP connection. The server responds to the request with an indication of whether there is an image update, and if there is one, includes within the HTTP response an indication of the location of the update within the overall GUI image. The browser saves the information from this initial response and then sends another HTTP request over another HTTP connection for the actual bitmap image portion to insert into the location indicated in the prior HTTP response. Thus, in some browsers, multiple connections are opened to obtain a single image update. The GUI update request control module 112 may be configured to operate with these alternative browsers so as to frequently prompt the sending of new HTTP requests to update the GUI display based upon operation of the browser's rendering engine generally as described above.

Figure 2:
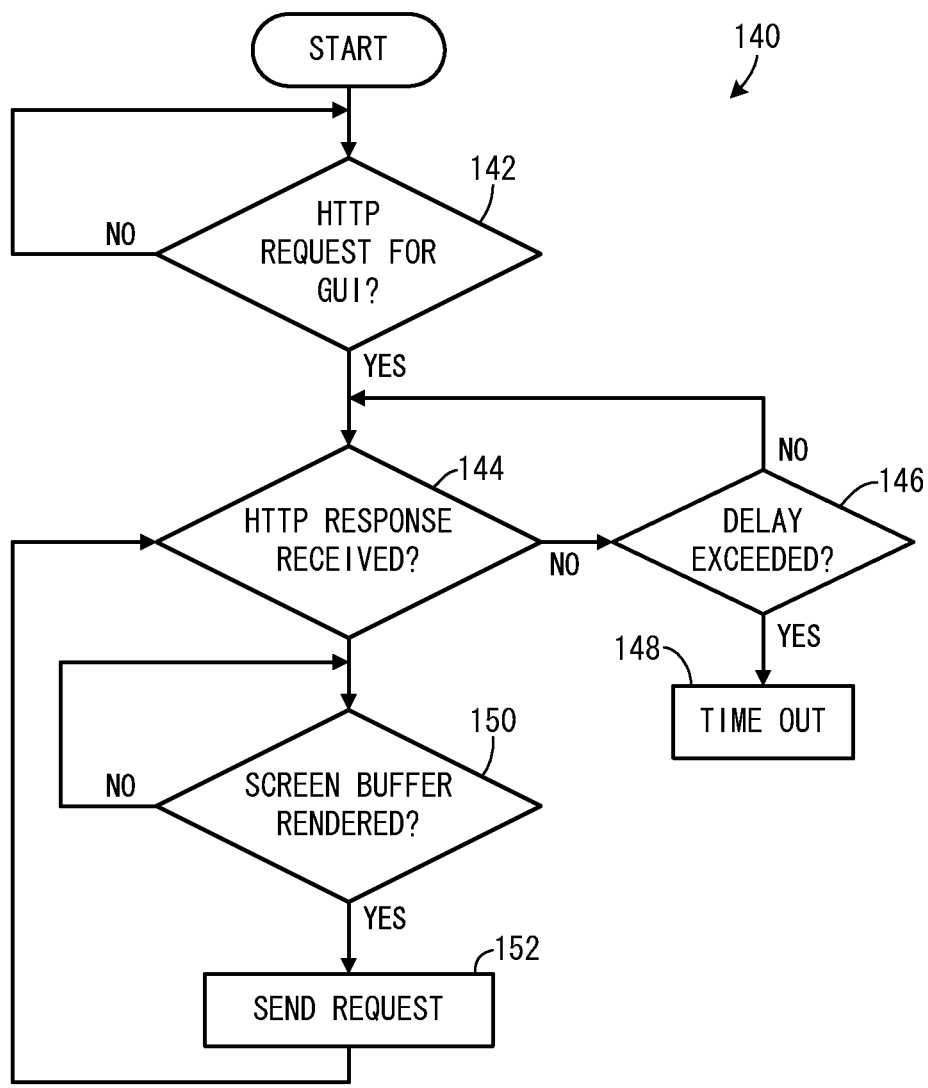
FIG. 2 is shows a flow diagram representing by way of example a process performed by GUI update request control module of the system of FIGS. 1A and 1B.

FIG. 2 is an illustrative flow diagram 140 representing by way of example a procedure that may be performed by GUI update request control module 112 of FIG. 1A. This procedure may be implemented with computer program code encoded in a computer readable storage device accessible by client 106 so that the code may be executed by client 106. For example, the code may be implemented by JavaScript downloaded from the server and stored in the client's random access memory (RAM). The procedure starts as indicated by the "start" block and proceeds to operation 142, in which control module 112 determines whether an HTTP request was sent for GUI bitmap image data 113 that corresponds to remote application 108. If no such HTTP request is detected, then the procedure returns to operation 142 until the request is detected. If an HTTP request for image data 113 is detected, then the procedure flows to operation 144, wherein it is determined whether an HTTP response to the request for the image data has been received. If not, then the procedure flows to operation 146 to determine whether a delay in receiving an HTTP response exceeds a configured delay interval. If the delay in receipt of the HTTP response does not exceed the delay threshold, then the procedure flows back to operation 144 to continue monitoring for the HTTP response. If it is determined at operation 146 that the delay exceeds the threshold, then the procedure flows to operation 148, which returns a time-out error to protect against indefinite delays causing the browser to hang. In one embodiment, the HTTP request may be triggered to be retransmitted by HTTP client 105 in response to the time-out error.

If it is determined in operation 144 that an HTTP response containing the image data was received, then the procedure flows to decision 150 to determine whether rendering module 109 has finished rendering the image data from the prior HTTP response. When the rendering is complete, then, in operation 152, a signal is sent to HTTP client protocol module 105 to request another HTTP request for updated image data. If no HTTP response has been received, then operation 150 continues to monitor rendering module 109. Because the rendering is performed by browser 102 outside the visibility or control of GUI update module 112, which, in one embodiment, runs in a JavaScript sandbox, there may not be a simple way to determine when the rendering is complete other than by periodically polling browser 102.

Figure 3:
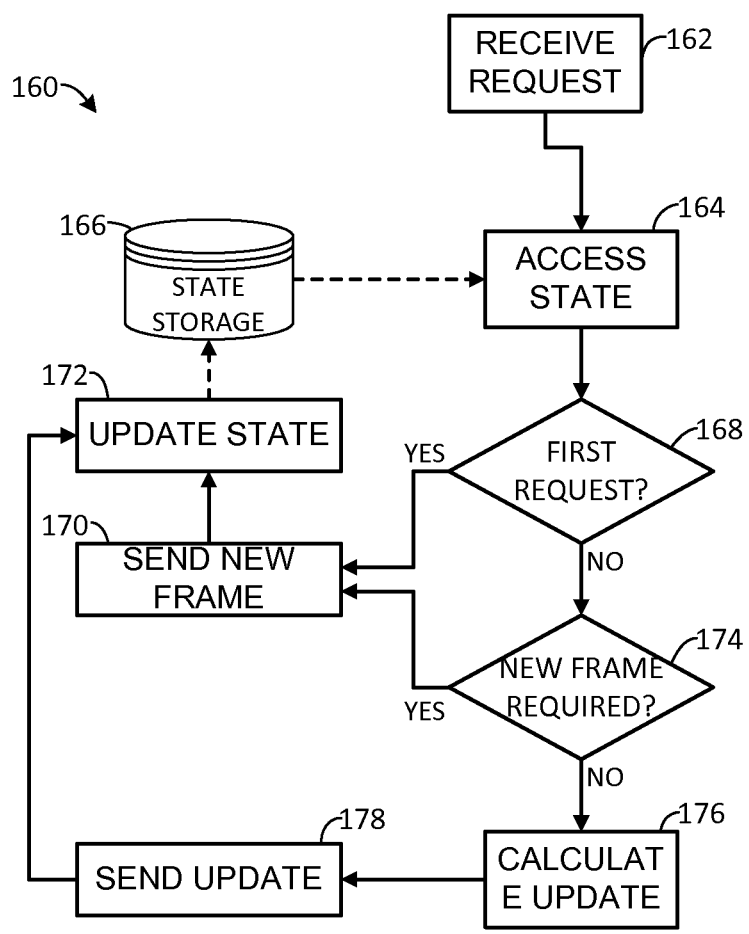
FIG. 3 is an illustrative flow diagram representing a process performed by GUI update response control module of the system of FIGS. 1A and 1B.

FIG. 3 shows by way of example a process 160 performed by GUI update response control module 115 of FIG. 1A to determine whether to send a full "key frame" to client 106 or just an update region, and calculate which update region. Process 160 of may be implemented with computer program code encoded in a computer readable storage device. In operation 162, a request 127 is received by GUI update control module 115 from HTTP server protocol module 114 for bitmap image information. After the request is received, the procedure flows to operation 164 in which image state is accessed from state storage 166, which may be a data structure maintained in volatile or non-volatile memory that stores information concerning bitmap image data previously provided to browser 102 on the client machine 106.

Depending on information obtained from state storage 166, it is determined in operation 168 whether the received request is the first request received from client 106 for the GUI bitmap data. If so, the procedure flows to operation 170 wherein an entire bitmap image frame (i.e. a key frame) is sent to HTTP server protocol module 114 for transmission to browser 102. Then in operation 172, the state storage 166 is updated to indicate the entire image frame was sent. If, in operation 168 it is determined that the received request was not the first request, then the procedure flows to operation 174 to determine whether to send another entire new image frame (i.e. another key frame) to browser 102. Typically, there are limitations upon the number of layers of bitmap image information that a browser can manage. GUI update response control module 115 uses the state information to decide whether to send a new key frame based upon the prior layers of bitmap image information that were sent. If another entire frame should be sent, then the procedure flows to operation 170 and then operation 172 as previously described.

If, in operation 174, it is determined that a new frame should not be sent, then the procedure flows to operation 176 wherein an update image is identified. The update image is a region of frame buffer 111 containing modified image data. Modified regions of frame buffer 111 may be identified by comparing previous and current frame image data using an algorithm that evaluates the difference pixel by pixel, or by sets of pixels. In one embodiment, when multiple regions of frame buffer 111 are modified, they may be ranked so that a region having an oldest modification may be sent first. Once an update image is identified, the procedure flows to operation 178, wherein a bitmap image update together with location information for the update is sent to HTTP server protocol module 114 for transmission to browser 102. Then, the procedure flows to operation 172 wherein state storage 166 is updated to indicate the sending of the update image.

In an alternate embodiment, GUI update response control module 115 can transmit multiple modifications to frame buffer 111 by creating a transparent mask in which non-transparent areas contain the GUI image changes. This approach reduces the number of HTTP connections required to retrieve image updates. For example, assume that two rectangular areas changed within the frame buffer 111 since the last update to the GUI display 104 on the client 106. Because of certain browser limitations, it may not ordinarily be feasible to send both image updates in one response payload. However, the use of a transparency mask that overlays the entire area and that contains the two non-transparent rectangles of changed area allows both changes to be communicated within a single HTTP response.

User Device Input

Referring to FIG. 1B, user input HTTP connections 230 are used to transmit user input device signals from the client 106 to the server 110. In the course of the user 116 using the client machine 106 to access an application running on the server 110, the user 116 provides input to one or more input devices, represented by input device ("UID") 107, such as mouse, keyboard, touchscreen, microphone (e.g., for use in voice recognition) or other user input device. The user's input is communicated from the client 106 to the server 110 over user input HTTP connections and is injected into the application 108, possibly resulting in changes to the bitmap image 113 within the server frame buffer 111. The GUI update HTTP connections described above with reference to FIG. 1A are used to update the GUI display 104 on the client 106 in light of the changes in server frame buffer content resulting from the user device inputs.

In the illustrated embodiment, user 116 provides an input 210 to user input device 107, which produces a corresponding user interface device (UID) signal 212. Evaluation and encoding module 180 intercepts the UID signal 212 and produces encoded UID signal 214, which it provides to the HTTP client protocol module 105. HTTP client protocol module 105 opens an HTTP connection, packages the information in encoded UID signal 214 in HTTP user interface device (UID) request 216, which it sends over a network connection to server 110. HTTP server 114 receives HTTP UID request 216 and forwards encoded UID information 218 to input injection module 182. HTTP server 114 also sends HTTP acknowledgement message 217 back to the client 106 and closes HTTP connection 230. Application 108 receives the encoded UID information as input as indicated by arrow 220. Application 108 may respond to the input, and as a result may change the contents of the bitmap image 113 as indicated by arrow 222.

For example, a user might provide input to UID 107 causing a new window to open in application 108 running on the server 110. Through the automatic series of signals described above, corresponding UID input signal 220 is injected into application 108 on server 110. In response, application 108 may open the window and display the result, causing content of bitmap image 113 on server 110 to change to indicate the newly opened window. It will be understood that the update of GUI display 104 on client 106 to show the newly opened window takes place through GUI update HTTP connections described above with reference to FIG. 1A, and that these GUI update HTTP connections may be independent of the user input HTTP connections used to transmit UID input that causes the new window to open.

In some embodiments, browser 102 allows for multiple parallel (i.e. that overlap in time) HTTP connections in which case browser 102 can open an HTTP connection 230 on which to send an HTTP user interface device (UID) requests that overlaps in time with an HTTP connection 130 opened for an HTTP GUI update request. Moreover, in some embodiments a browser 102 may open multiple HTTP connections 130 to send multiple HTTP GUI update requests in parallel. Multiple responses may be provided on these multiple HTTP connections, each corresponding to a different portion of the bitmap image 113 that have changed. Thus, different changes can be sent on different HTTP connections opened in response to completion of rendering of an updated GUI display 104. Alternatively, for example, HTTP GUI update requests may be sent in response to some other event such as receipt of a response to a previous GUI update request.

Figure 4:
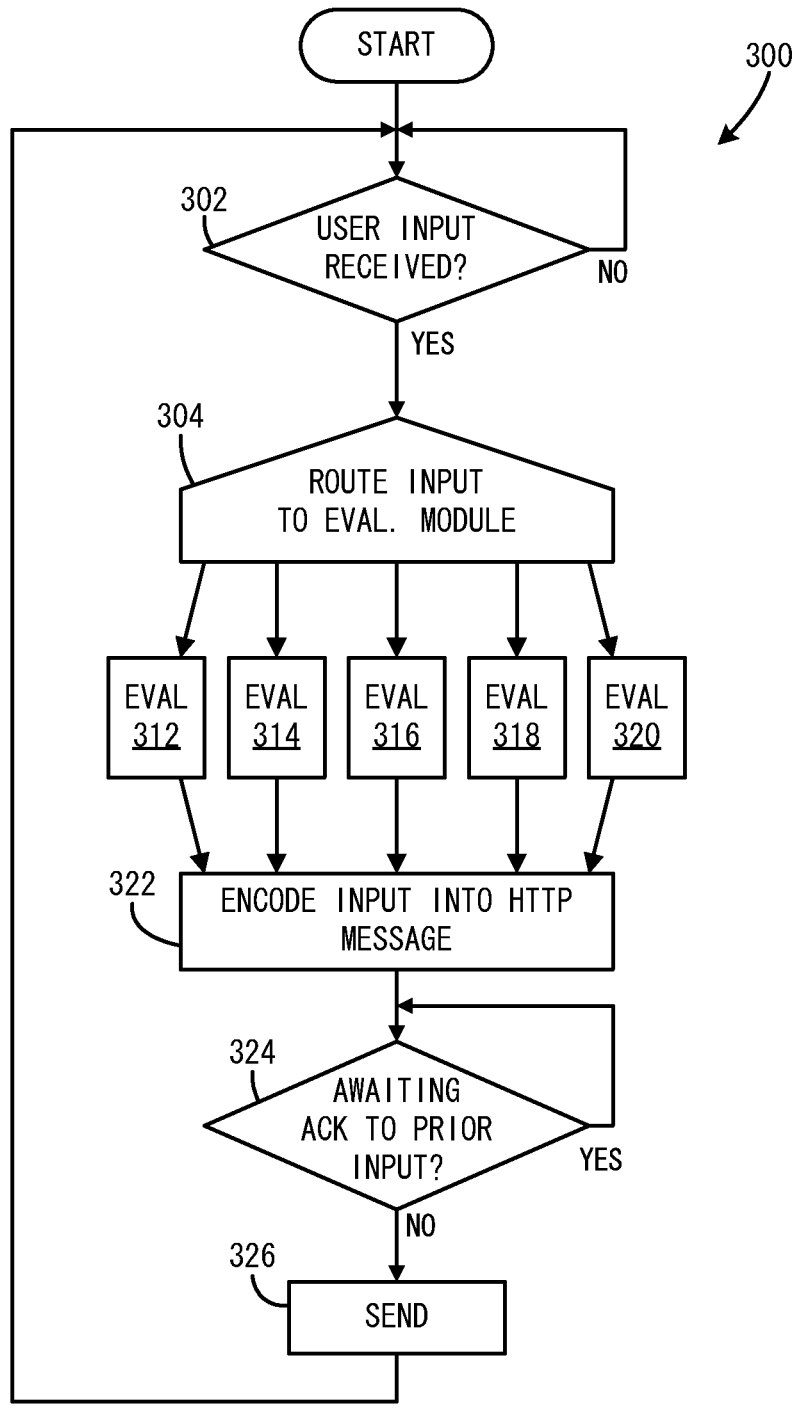
FIG. 4 is an illustrative flow diagram representing a process performed by the evaluation and encoding module of FIGS. 1A and 1B.

FIG. 4 shows a flow diagram 300 representing by way of example a process 300 performed by the evaluation and encoding module 180 of FIG. 1B in accordance with some embodiments. The process of flow diagram 300 may be implemented with computer program code encoded in a computer readable storage device. The procedure begins at the "start" block and proceeds to operation 302, wherein it is determined whether new user input has been received by user input device 107. If no new user input has been received, then the procedure continues to await new user input. In some embodiments, client 106 may include multiple user input devices such as a mouse, keyboard, touchscreen, microphone and camera (not shown). If new user input has been received from one of the devices, then the procedure flows to operation 304 to determine which of the multiple user input devices received the new user input. A respective evaluation module (each corresponding to respective executable code modules) 312-320 may be implemented for each input device. Decision module 304 passes control to a respective evaluation module 312-320 that corresponds to the input device that received the new user input. Each evaluation module 312-320 acts as a filter to incoming user inputs. Evaluation modules 312-320 may integrate or consolidate a series of user inputs to an input device to simplify the message sent to server 110 or may ignore all or some of the inputs to input devices. For example, a series of smaller scroll-wheel inputs may be consolidated to a single larger scroll-wheel input, or random back-and-forth mouse movements may be ignored.

Following evaluation of the new input by one or more modules 312-320, the procedure flows to operation 322 wherein new input is encoded in one or more HTTP messages containing browser event codes in accordance with the evaluation by the one or more of the modules 312-320. The procedure then flows to operation 324 wherein it is determined whether the client 106 is awaiting an HTTP UI input device acknowledgement message responsive to the previously sent HTTP UI input device message. If yes, then the procedure continues to wait. If no, then control flows to operation 326, which sends the HTTP UI device input message encoded by module 180 to server 110. Control then returns to operation 302.

In some embodiments, a typical browser produces mouse events in response to user input to the mouse device (not shown), one of user input devices 107, at a resolution of about one millisecond or perhaps somewhat faster. Since HTTP UI device input messages typically cannot be generated and sent to the server 110 at that rate, mouse events are instead sampled in the browser at a lower rate. In some embodiments, the lower rate is determined by the speed at which server 110 can accept events. For example, if client 106 sends HTTP UI input device messages to server 110 indicating mouse input device events, and if server 110 responds quickly with an HTTP acknowledgement message, then in operation 324, an additional mouse input device event information is sent. If server 110 delays in responding, or the network is slow, then an mouse additional mouse input device information is not sent at operation 324 until the previous response is acknowledged.

The degree or amount of consolidation or compression of user input device signal information may depend upon the amount of delay in receiving an HTTP acknowledgment message from the server 110. For example, the longer the delay in receiving an acknowledgment from server 110, the larger the number of incremental mouse positions that evaluation module 312 will filter out so as to not be reported by client 106 to server 110. Evaluation module 312 may evaluate information content of mouse movements to determine whether mouse movements can be ignored. For instance, a user might wiggle a mouse back and forth rapidly from left to right without ultimately changing mouse position. In that case, evaluation module 312 may filter out information corresponding to such back and forth movement so as to not send it to the server 110. It will be appreciated that such movement can generally be ignored.

Also, the server may analyze the GUI to determine control areas of the screen, such as buttons with tooltips, which should not be ignored for mouse movement, because they generate a "mouse-over" event causing additional information to pop up when the mouse moves over these controls. To communicate locations of these regions to the client 106, the server 110 may analyze the application 108 and send information indicating the locations of these control regions, typically rectangular in shape, to client 106. Identification of these important regions of the screen image may be appended to HTTP responses, or appended to input device acknowledgements. These regions identify important control areas, and remain in effect until new rectangles of interest are sent, or the interest in the rectangles is cleared.

Referring again to FIG. 1B, for example, user input 210 may comprise a plurality of inputs to user interface device 107. User interface device 107, in turn, produces a corresponding series of signals 212. The evaluation and encoding module 180 intercepts the series of signals 212, performs the evaluation described above with reference to FIG. 4, and provides to the HTTP client protocol module 105 a corresponding filtered UI signal 214, which may be a filtered or compressed version of multiple user interface signals 212. HTTP client module 105 opens a distinct user input HTTP connection and sends an HTTP UID request 216 that includes the filtered (and possibly consolidated or compressed) user interface signal 214. The HTTP server protocol module 114 sends an HTTP acknowledgment message 218 back to the client 106 and sends the encoded user input information to the user input injection module 182 as previously described. Application 108 then receives the filtered user input information as input as indicated by arrow 220. The application, in turn, may cause changes to the content of the bitmap image 113 in response to the filtered input as indicated by arrow 222.

Returning to FIG. 4, module 314 evaluates user input to the keyboard input device (not shown), one of user input devices 107. A typical browser produces keyboard events at a rate that generally is low enough so that each keyboard event can be transmitted by client 106 to browser 102. There are exceptions, however. For example, in some embodiments, evaluation module 314 may ignore a user's repeatedly pressing the control key since that would not be expected to have any effect.

In some embodiments, cross browser support for mouse input and keyboard input may be provided by implementing corresponding modules 312, 314 that incorporate multiple interpretations of mouse and keyboard input. For example, the Internet Explorer (IE) browser refers to events using a 'window.event', whereas the Chrome browser may only refer to 'event'. Modules 312, 314 may be implemented to take into account the server computer environment and capabilities. For example, in a Microsoft Windows operating system environment, five shift key presses represent a feature, but in a Linux operating system environment, multiple shift key presses represent nothing, and can be ignored.

Figure 5:
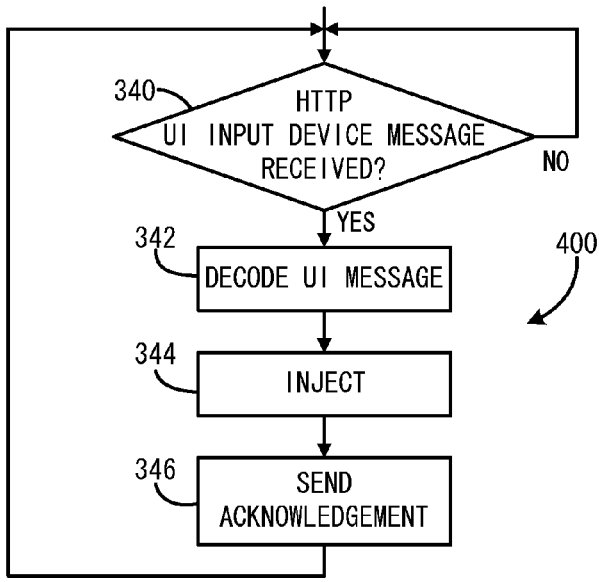
FIG. 5 is an illustrative flow diagram of a process performed by the user input injection module of FIGS. 1A and 1B.

FIG. 5 shows flow diagram 400 that illustrates by way of example a process that may be performed by user input injection module 182 of FIG. 1B. In operation 340 it is determined whether an HTTP UI message has been received from client 106. If no new HTTP UI message has been received, then the procedure continues to await a new message. If a new HTTP UI message has been received, then the procedure flows to operation 342, in which the HTTP UI message is decoded to convert the message from browser event codes into a format suitable for the operating system running on the server 110, such as Windows event codes. Then in operation 344, the event codes are injected into the operating system running on server 110 and therefore to application 108 accessed by the client 106 via appropriate system calls such as Windows API calls and Windows API hooks. In operation 346, an HTTP acknowledgement message is sent to client 106. The acknowledgement message may contain information such as whether the HTTP UI message was accepted or not accepted. If the user input device comprises a mouse scroll wheel that requires information about the scroll range available, then the acknowledgement may contain the additional information needed for proper scroll wheel operation, for example. The procedure then returns to operation 340.

Interpretation of GUI Display

Figure 6:
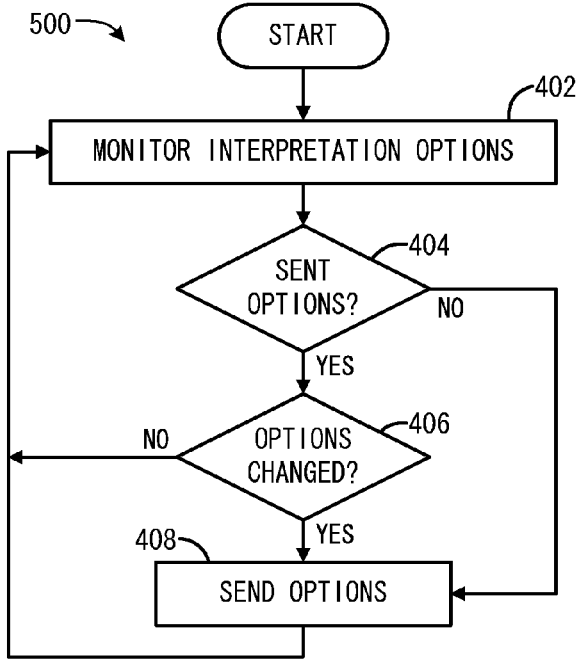
FIG. 6 is a flow diagram of a process in which the client sends an HTTP message with an interpretation of its UI display to the server of FIGS. 1A and 1B.

FIG. 6 shows flow diagram 500 illustrating by way of example a process that may be implemented by client 106 for sending an HTTP message with an interpretation of its GUI display 104 to the server 110. The image capture parameters or method used by server 110 to capture bitmap 113 and updates thereto can be adjusted to better match capabilities of the browser 102, which is responsible for rendering the GUI display 104 on the client 106. The procedure begins as illustrated by the "start" block and flows to operation 402, in which UI interpretation options employed by the browser 102 on the client 106 are monitored to determine how to interpret the contents of the frame buffer 104-1 on the client. The interpretation options may include display alternatives including window size, color depth, and resolution. These options may change automatically or by a user clicking on a menu option. In operation 404 it is determined whether the interpretation options have been sent to the server 110 previously. If not, then control flows to operation 408 wherein the interpretation options are sent to server 110 in an HTTP UI interpretation message. Control then returns to operation 402. If it is determined in operation 404 that the options have been sent, then control flows to operation 406, in which it is determined whether the interpretation options have changed. If the interpretation options have changed, then control flows to operation 408, which sends the current interpretation to the server 110 in an HTTP UI interpretation message. Otherwise, the procedure returns directly to operation 402.

Figure 7:
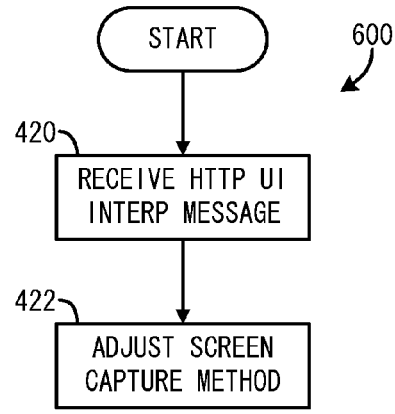
FIG. 7 is an illustrative flow diagram of a process in which the server transforms its method of capture of UI to its screen buffer of FIGS. 1A and 1B.

FIG. 7 shows a flow diagram 600 illustrating by way of example a process that may be performed by server 110 to transform its method of capture of UI to its screen buffer in response to receipt of an HTTP UI interpretation message. The procedure begins with the "start" block and proceeds to operation 420 wherein the HTTP UI interpretation message is received from client 106. The procedure then flows to operation 422 in which the screen capture is adjusted in accordance the HTTP UI interpretation message. In one embodiment, requests to the operating system and graphics driver operative on the server 110 can be made that result in changes in capture of the bitmap image 113 on the server 110 due to one or more of resizing of the server screen buffer and display, changes to color depth changes, to encoding, or changes in resolution level, for example.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

I claim:

1. A method in a server for providing remote access to an application, the method comprising:
   maintaining a mapping between a plurality of (Uniform Resource Locators) URLs and a corresponding plurality of applications;
   receiving a URL from a user executing a user interface on a client device remote from the server and remote from the corresponding plurality of applications;
   identifying one application of the corresponding plurality of applications, the one application corresponding to the received URL;
   remoting the one application over a sequence of Hypertext Transfer Protocol (HTTP) requests and responses to the user via a remoting protocol, by:
      receiving a first HTTP request for a graphical user interface (GUI) of the one application;
      encoding a region of a server-side frame buffer containing image data corresponding to the GUI of the one application;
      sending the encoded region of the server-side frame buffer to the client device in response to the first HTTP request, wherein the client device renders the encoded region and generates a second HTTP request for an update to the server-side frame buffer in response to completing the rendering of the encoded region;
      receiving, from the client device, the second HTTP request subsequent to the first HTTP request for an update to the GUI of the one application;
      in response to the second HTTP request, computing a difference between the server-side frame buffer and a client-side frame buffer to identify modified image data;
      sending to the client device the modified image data in response to the second HTTP request;
      receiving, from the client device, an HTTP user interface (UI) interpretation message that indicates how an Internet browser on the client device interprets contents of the client-side frame buffer, wherein the HTTP UI interpretation message is used to transform a screen capture process on the server according to capabilities of the Internet browser of the client; and
      adjusting the screen capture process on the server based on the HTTP UI interpretation message received from the client device, wherein the adjusting the screen capture process includes invoking a request to an operating system and graphics driver on the server to change a capture of a bitmap image in the frame buffer of the server according to information contained in the HTTP UI interpretation message.

2. The method of claim 1 wherein the modified image data includes a portion of an entire GUI of the one application that was modified in response to a user input transmitted from the client device to the server.

3. The method of claim 1 wherein location information is included in cascading style sheet (CSS) instructions included in the response to the first HTTP request, the CSS instructions causing the client device to position the encoded region on an output display at a location consistent with the region in the server-side frame buffer that was encoded into the encoded image.

4. The method of claim 1 wherein the encoding the region of the server-side frame buffer including the modified image data comprises encoding the modified image data into a plain-text encoded image.

5. The method of claim 1 wherein the encoding the region of the server-side frame buffer including the modified image data comprises encoding the modified image data into a binary encoded image.

6. The method of claim 1 wherein the encoded region of at least a portion of the graphical user interface (GUI) generated by the one application comprises an entire desktop view generated by an operating system user interface.

7. The method of claim 1, further comprising:
   transmitting executable code to the client device upon an initial connection to the client device, the code causing the client to send the sequence of HTTP requests.

8. The method of claim 7 wherein the transmitted executable code executes in conjunction with an Internet browser executed by the client device.

9. The method of claim 1 wherein the remoting protocol does not require a persistent connection or a session.

10. A server for providing remote access to an application, comprising:
    a memory;
    a processor;
    instructions stored in the memory and configured, when executed by the processor, to:

receive a Uniform Resource Locator (URL) from a user executing a user interface on a client device remote from the server;
identify an application of a plurality of applications that corresponds to the received URL; and
a Graphical User Interface (GUI) update response control module stored in the memory and configured, when executed on the processor, to remote the application to the user via a remoting protocol over a sequence of Hypertext Transfer Protocol (HTTP) requests and responses by:
receiving a first HTTP request for a graphical user interface (GUI) of the application;
encoding a region of a server-side frame buffer containing image data corresponding to the GUI of the application;
sending the encoded region of the server-side frame buffer to the client device in response to the first HTTP request, wherein the client device renders the encoded region and generates a second HTTP request for an update to the server-side frame buffer in response to completing the rendering of the encoded region;
receiving a second HTTP request for an update to the GUI of the application, the second HTTP request subsequent to the first HTTP request;
in response to the second HTTP request, computing a difference between the server-side frame buffer and a client-side frame buffer to identify modified image data;
sending to the client device, in response to the second HTTP request, the modified image data;
receiving, from the client device, an HTTP user interface (UI) interpretation message that indicates how an Internet browser on the client device interprets contents of the client-side frame buffer, wherein the HTTP UI interpretation message is used to transform a screen capture process on the server according to capabilities of the Internet browser of the client; and
adjusting the screen capture process on the server based on the HTTP UI interpretation message received from the client device, wherein the adjusting the screen capture process includes invoking a request to an operating system and graphics driver on the server to change a capture of a bitmap image in the frame buffer of the server according to information contained in the HTTP UI interpretation message.

11. The server of claim 10 wherein the remoting protocol does not require a persistent communications connection or a session.

12. The server of claim 10 wherein the encoded region includes one of: text-coded image data or binary coded image data.

13. A method in a client for providing remote access to an application running on a server, the method comprising:
causing a hypertext transfer protocol (HTTP) client module to transmit a first HTTP request for an update to a frame buffer of the server;
receiving an encoded region of the frame buffer containing image data corresponding to the graphical user interface (GUI) of the application executing on the server;
decoding and rendering the encoded region of the frame buffer on a display coupled to the client device by a rendering module;
monitoring the rendering module to intercept completion status of the rendering module to detect when rendering the encoded region of the frame buffer is complete;
causing the HTTP client module to transmit a second HTTP request for another update to the frame buffer in response to detecting that rendering the encoded region of the frame buffer is complete;
receiving, from the client device, an HTTP user interface (UI) interpretation message that indicates how an Internet browser on the client device interprets contents of the client-side frame buffer, wherein the HTTP UI interpretation message is used to transform a screen capture process on the server according to capabilities of the Internet browser of the client; and
adjusting the screen capture process on the server based on the HTTP UI interpretation message received from the client device, wherein the adjusting the screen capture process includes invoking a request to an operating system and graphics driver on the server to change a capture of a bitmap image in the frame buffer of the server according to information contained in the HTTP UI interpretation message.

14. The method of claim 13, further comprising:
receiving a second encoded region of the frame buffer from the server in response to the second HTTP request; and
combining pixel data of the second encoded region of the frame buffer received from the server with pre-update pixel data received in previous HTTP responses from the server in order to render the update on the display coupled to the client.

15. The method of claim 14, further comprising:
determining a limitation related to a number of image layers that can be composited on the client by combining the pixel data with pre-update pixel data;
transmitting the limitation from the client to the server; and
in response to transmitting the limitation, receiving a new full bitmap from the server before the client reaches the number of image layers specified by the limitation.

16. The method of claim 13, further comprising:
receiving a second encoded region of the frame buffer from the server in response to the second HTTP request; and
causing the HTTP client module to transmit a third HTTP request to obtain a location of the second encoded region in the frame buffer prior to rendering the second encoded region, such that content of the second encoded region and the location of the content are received in separate HTTP responses.

17. The method of claim 13, further comprising:
reducing a sampling rate of mouse events of a browser on the client, wherein the sampling rate is determined based on a speed at which the server is capable of accepting events.

18. The method of claim 17, wherein reducing the sampling rate further comprises:
transmitting one or more HTTP UI input device messages to the server indicating mouse input events;
receiving HTTP acknowledgements from the server in response to the one or more HTTP UI input device messages; and
filtering, by the client, one or more mouse events from being reported to the server based on a delay in receiving the HTTP acknowledgments from the server.

* * * * *